US009040110B2

(12) United States Patent
Erickson et al.

(10) Patent No.: US 9,040,110 B2
(45) Date of Patent: *May 26, 2015

(54) SHORTENING PARTICLE COMPOSITIONS AND DOUGH PRODUCTS MADE THEREFROM

(71) Applicant: General Mills, Inc., Minneapolis, MN (US)

(72) Inventors: Braden J. Erickson, Eden Priarie, MN (US); Jon D. Seibold, Mahtomedi, MN (US); Alan A. Oppenheimer, Savage, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,133

(22) Filed: Aug. 1, 2013

(65) Prior Publication Data

US 2014/0037793 A1 Feb. 6, 2014

Related U.S. Application Data

(63) Continuation of application No. 13/017,942, filed on Jan. 31, 2011, now Pat. No. 8,518,470, which is a continuation-in-part of application No. 12/880,685, filed on Sep. 13, 2010, now Pat. No. 8,435,592.

(51) Int. Cl.
*A23D 9/00* (2006.01)
*A21D 10/00* (2006.01)
*A21D 13/00* (2006.01)
*A21D 2/16* (2006.01)
*A23D 9/04* (2006.01)
*A23D 9/05* (2006.01)

(52) U.S. Cl.
CPC .. *A23D 9/00* (2013.01); *A21D 2/16* (2013.01); *A21D 10/005* (2013.01); *A23D 9/04* (2013.01); *A23D 9/05* (2013.01)

(58) Field of Classification Search
None
See application file for complete search history.

(56) References Cited

U.S. PATENT DOCUMENTS

| 3,714,210 | A | 1/1973 | Schweiger et al. |
| 3,800,056 | A | 3/1974 | Mitchell, Jr. |
| 3,859,447 | A | 1/1975 | Sreenivasan |
| 4,018,755 | A | 4/1977 | Wang |
| RE30,086 | E | 8/1979 | Carlile et al. |
| 4,211,800 | A | 7/1980 | Scharschmidt et al. |
| 4,268,534 | A | 5/1981 | Kawada et al. |
| 4,810,513 | A | 3/1989 | Van Liere |
| 4,839,187 | A | 6/1989 | Mai et al. |
| 4,891,233 | A * | 1/1990 | Belanger et al. ............... 426/94 |
| 5,190,868 | A | 3/1993 | Kokusho et al. |
| 5,578,334 | A | 11/1996 | Sundram et al. |
| 5,667,837 | A | 9/1997 | Broomhead et al. |
| 5,686,131 | A | 11/1997 | Sato et al. |
| 5,710,365 | A | 1/1998 | Kerr et al. |
| 5,843,497 | A | 12/1998 | Sundram et al. |
| 5,874,117 | A | 2/1999 | Sundram et al. |
| 6,022,577 | A | 2/2000 | Chrysam et al. |
| 6,106,885 | A | 8/2000 | Huizinga et al. |
| 6,277,433 | B1 | 8/2001 | Lantz et al. |
| 6,312,751 | B1 | 11/2001 | Cain et al. |
| 6,312,752 | B1 | 11/2001 | Lansbergen et al. |
| 6,406,737 | B1 | 6/2002 | Cain et al. |
| 6,630,172 | B2 | 10/2003 | Batarseh |
| 6,863,915 | B2 * | 3/2005 | Huxel ........................... 426/312 |
| 7,229,653 | B2 | 6/2007 | Sundram et al. |
| 8,435,592 | B2 * | 5/2013 | Erickson et al. ............. 426/607 |
| 8,518,470 | B2 * | 8/2013 | Erickson et al. ............. 426/607 |
| 2002/0142072 | A1 * | 10/2002 | Huxel ............................. 426/98 |
| 2003/0082289 | A1 | 5/2003 | Huxel |
| 2003/0175403 | A1 | 9/2003 | Gurin |
| 2004/0028622 | A1 | 2/2004 | Gurin |
| 2004/0047969 | A1 | 3/2004 | Wester et al. |
| 2004/0197463 | A1 | 10/2004 | Gottemoller |
| 2006/0013934 | A1 | 1/2006 | Villagran et al. |
| 2006/0286272 | A1 | 12/2006 | Hanselmann |
| 2006/0292276 | A1 | 12/2006 | Huxel et al. |
| 2007/0128340 | A1 | 6/2007 | Andrews et al. |
| 2007/0160739 | A1 | 7/2007 | Kuwabara et al. |
| 2007/0178218 | A1 | 8/2007 | Yager et al. |
| 2007/0190186 | A1 | 8/2007 | Loh et al. |
| 2008/0206413 | A1 | 8/2008 | Fine et al. |

(Continued)

FOREIGN PATENT DOCUMENTS

| GB | 855349 | 11/1960 |
| GB | 1005804 | 9/1965 |

(Continued)

OTHER PUBLICATIONS

"ADM Product Code 106-150", Technical Data Sheet, ADM—Packaged Oils, p. 1.

"Determination of Solid Fat Content in Edible Oils and Fats by the Official Direct Method (AOCS Cd 16b-93)", Application Note 13, Part No. SFC:10-09, Oxford Instruments, pp. 2.

"Dritex S Flakes", Product Data Sheet, ACH Food Companies, Inc. pp. 2 (Oct. 9, 2007).

"Dropping Point", Sampling and Analysis of Commercial Fats and Oils, AOCS Official Method Cc 18-80, Reapproved 1997, Revised 2001, pp. 1-2.

(Continued)

*Primary Examiner* — Carolyn Paden
(74) *Attorney, Agent, or Firm* — Rachel A. Kahler; Daniel C. Schulte

(57) ABSTRACT

The invention relates to shortening particle compositions that are suitable for use in preparing batter or dough products such as biscuits, pizza crusts, pot pie crusts, cinnamon rolls, or dry mixes for same. Typically, the shortening compositions are low in trans fatty acids and in saturated fatty acids. For example, the shortening particle composition may comprise less than about 3% wt. total trans fatty acids and a total of about less than about 61% wt. saturated fatty acids and trans fatty acids.

17 Claims, 11 Drawing Sheets

(56) References Cited

U.S. PATENT DOCUMENTS

| | | |
|---|---|---|
| 2009/0029024 A1 | 1/2009 | McNeill et al. |
| 2009/0311387 A1 | 12/2009 | Plank et al. |
| 2011/0097471 A1 | 4/2011 | Arlinghaus |
| 2013/0337145 A1* | 12/2013 | Erickson et al. ............. 426/606 |
| 2014/0037793 A1* | 2/2014 | Erickson et al. ................ 426/62 |

FOREIGN PATENT DOCUMENTS

| | | |
|---|---|---|
| GB | 2081293 | 2/1982 |
| GB | 2176143 | 12/1986 |
| GB | 2210544 | 6/1989 |
| JP | 61001343 | 6/1985 |
| JP | 60145055 | 7/1985 |
| JP | 61095098 | 5/1986 |
| JP | 62273293 | 11/1987 |
| JP | 7313086 | 12/1995 |
| JP | 2000102345 | 4/2000 |
| JP | 2007174988 | 7/2007 |
| JP | 2007252203 | 10/2007 |
| JP | 2007282606 | 11/2007 |
| JP | 2008220290 | 9/2008 |
| JP | 2008263790 | 11/2008 |
| JP | 2008278833 | 11/2008 |
| JP | 2009072096 | 4/2009 |
| WO | WO-2007/061372 | 5/2007 |
| WO | WO-2009130928 | 10/2009 |
| WO | WO-2010007802 | 1/2010 |

OTHER PUBLICATIONS

"Solid Fat Content (SFC) by Low-Resolution Nucelar Magnetic Resonance—The Direct Method", Sampling and Analysis of Commercial Fats and Oils, AOCS Official Method Cd 16b-93 Revised 1993 pp. 1-10.

Latondress, E. G., "Formulation of Products from Soybean Oil" JAOCS 58:185 (1981).

List, G. R. "Effect of Interesterification on X-Ray Diffraction Patterns of Soy-Soy Trisaturate Blends", JAOCS 54(10) 412, 1977.

List, G.R. et al. "Margarine and Shortening Oils by Interesterification of Liquid and Trisaturated Triglycerides" JAOCS 72(3) 379 (1995).

Louis H. Going, "Interesterification Products and Processes", JOACS, Sep. 1967, vol. 41, 414A.

Petrauskaite et al. "Physical and Chemical Properties of trans-Free Fats Producted by Chemical Interesterification of Vegetable Oil Blends", JAOCS 75(4) 489 (1998).

Wiedermann "Margarine and Margarine Oil, Formulation and Control", JAOCS 55:823 (1978).

* cited by examiner

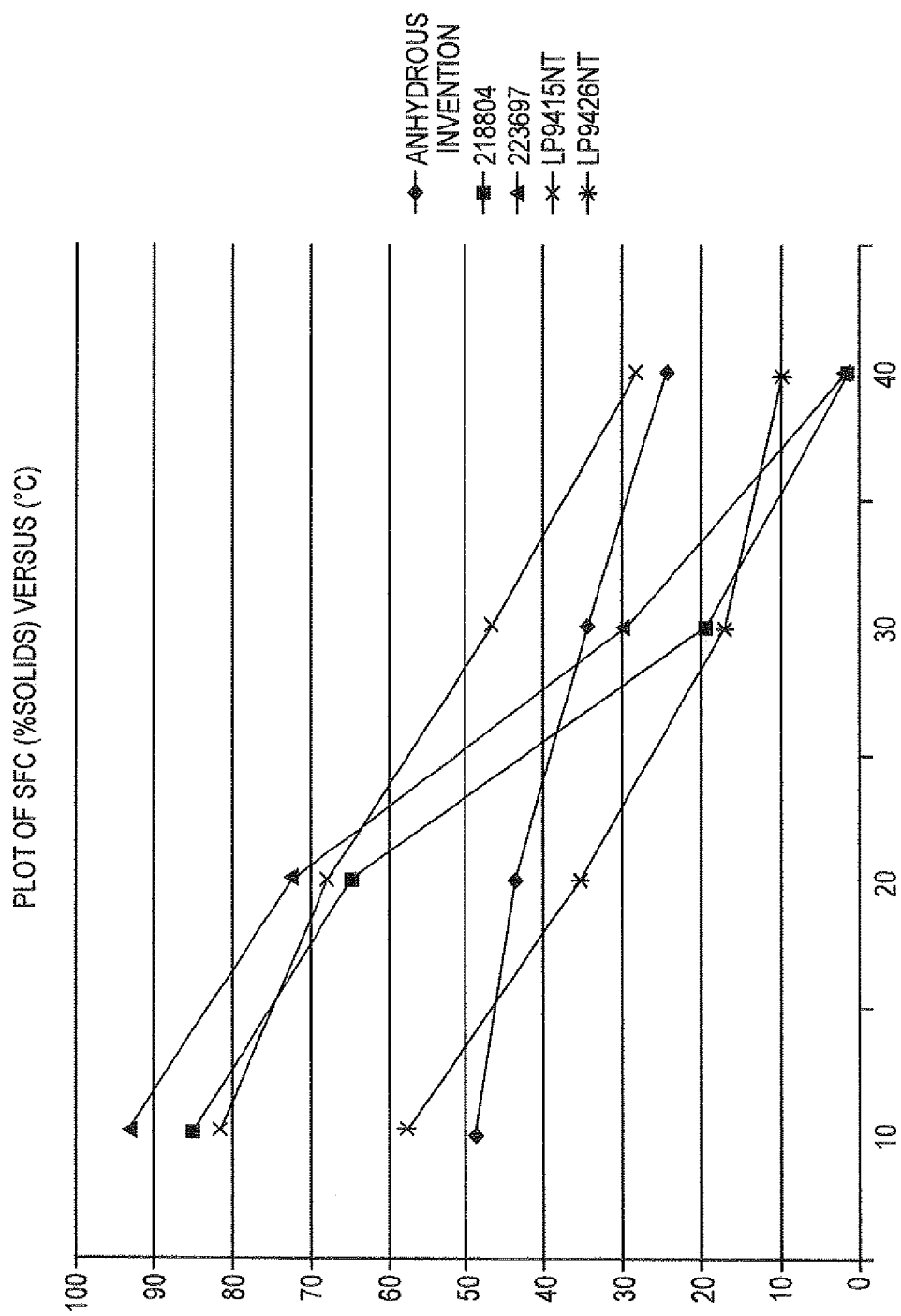

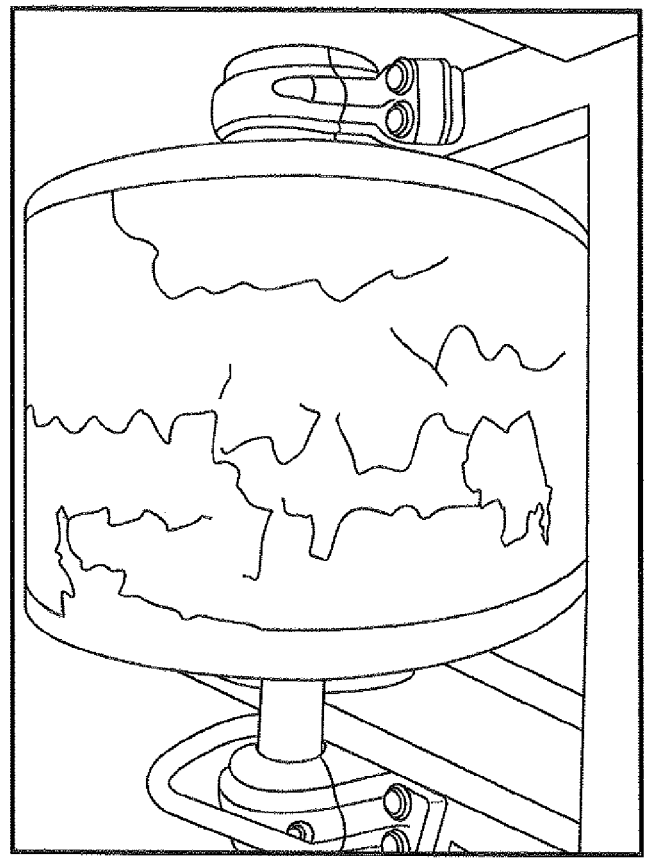
Fig. 6A

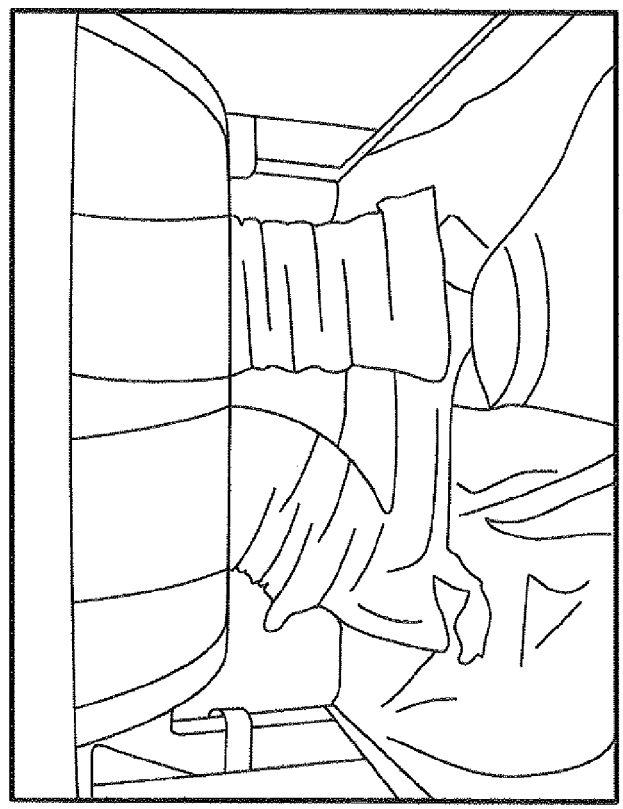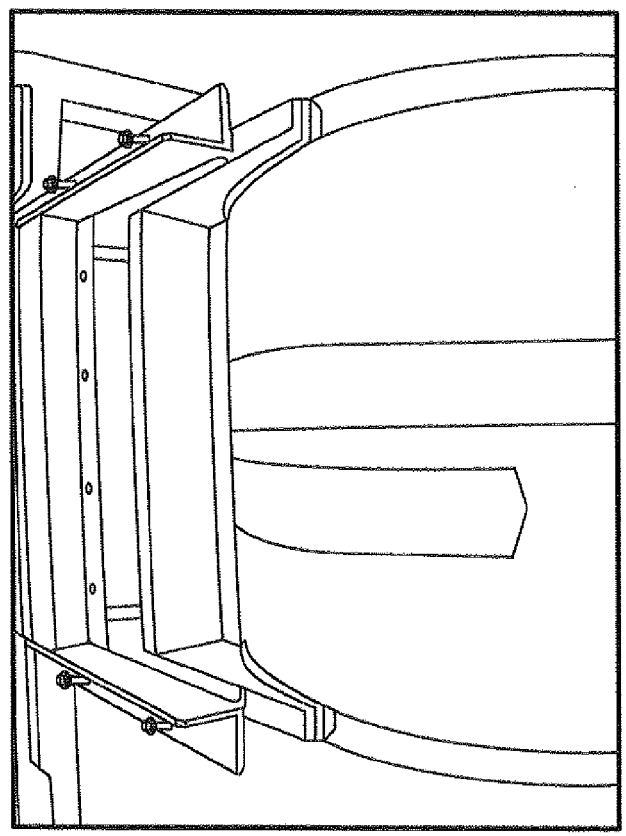
Fig. 6B

SHORTENING PARTICLE COMPOSITIONS AND DOUGH PRODUCTS MADE THEREFROM

CROSS-REFERENCE TO RELATED APPLICATIONS

This application is a continuation of U.S. Ser. No. 13/017,942, filed Jan. 31, 2011, now U.S. Pat. No. 8,518,470 which is a continuation-in-part of U.S. Ser. No. 12/880,685, filed Sep. 13, 2010, now U.S. Pat. No. 8,435,592, and entitled SHORTENING PARTICLE COMPOSITIONS AND DOUGH PRODUCTS MADE THEREFROM, the disclosure disclosures of which are incorporated herein by reference in their entireties.

BACKGROUND

Dough compositions for use in bakery products (e.g., biscuits) commonly include fat, water, flour, eggs, and a leavening agent (e.g., yeast) as the primary ingredients. The fats that are used in these products are commonly triglyceride-based fats that typically contain fairly high levels of saturated fats and/or trans fatty acids. With the present trend towards healthier food products, there is a high demand for bakery products that contain healthier fat compositions (i.e., fats having a reduced amount of saturated fats and/or trans fatty acids). In order to provide low trans fatty acid compositions, formulators have often used fat ingredients that are high in saturated fatty acids, for example, palm kernel oil and coconut oil. These oils are expensive and are typically obtained from non-U.S. sources. In view of this, alternative fat compositions that are low in trans fats and/or saturated fats are very desirable. Shortening compositions, that can be prepared from non-tropical oils, such as soybean oil, are also very desirable.

SUMMARY

The present invention relates to shortening particle compositions that are suitable for use in preparing batter or dough products such as biscuits, pizza crusts, pot pie crusts, cinnamon rolls, and various bread doughs, and dry mixes for same. In many embodiments the shortening compositions are low in trans fatty acids and in saturated fatty acids. For example, the shortening particle composition may comprise less than about 3% wt. total trans fatty acids and a total of about less than about 61% wt. saturated fatty acids and trans fatty acids.

Conventionally, shortening particles used in bakery products have fairly steep slope (m) for the Solids Fat Content (SFC) profile (i.e., a high SFC at 10° C. (50° F.) and low SFC at 40° C. (104° F.)). A fairly steep slope is considered desirable because it is characteristic of a fat composition that melts quickly when placed in the mouth thereby avoiding a "waxy" mouth feel when the fat is consumed as part of a bakery product. As discussed above, these compositions are typically based upon tropical base oils such as palm kernel oil and coconut oil that are expensive and are high in saturated fatty acids. In contrast to this, shortening particle compositions of the invention have a relatively flat slope (i.e., a relatively smaller negative slope) for the SFC profile. Unexpectedly, these compositions having a smaller negative slope can be used to prepare baked good (e.g., biscuits) that are acceptable to consumers. Additionally, a flat SFC slope is desirable since flakes prepared with a composition having a flat SFC profile are more stable as particle since the composition does not melt as easily with small temperature variations that may occur during manufacturing, shipping, and storage conditions. Advantageously, in many embodiments, the shortening particles have a low trans fatty acid content and/or a low saturated fatty acid content.

In many embodiments, the shortening particle compositions comprise an interesterified base oil and a hardstock fat that comprise one or more non-tropical base oils. As used herein the term "non-tropical base oil" refers to an oil that is derived from a plant or other organism that is not a "tropical" plant or other organism—the term "non-tropical base oil" excludes "tropical oils." The term "tropical oil" as used herein is given its ordinary meaning in the food arts, referring to any of several oils of tropical trees or plants, such as coconut, palm oil, and palm kernel oil, that contain little polyunsaturated fatty acid and are high in saturated fatty acids (Coconut oil is considered to contain about 92% saturated fat; palm kernel oil contains about 82% saturated fat, and palm oil contains about 50% saturated fat). A "tropical" tree or plant is one that is characteristic of or capable of growing naturally in a "tropical" region or climate, e.g., one that is frost-free with temperatures high enough to support year-round plant growth given sufficient moisture (e.g., tropical Florida); alternately, a "tropical" climate according to the Köppen climate classification, which is a non-arid climate in which all twelve months have mean temperatures above 18 C (64 F).

Examples of non-tropical base oils include oils obtained from soybean, rapeseed (canola), sunflower, peanut, hazelnut, walnut, cottonseed, olive, corn, grapeseed, rice bran, sesame, safflower, linseed/flax, oat, and wheat germ. These non-tropical base oils in their natural forms include relatively lower amounts of saturated fat compared to tropical oils, such as below about 27 percent saturated fat (cottonseed oil is about 26 percent saturated fat by weight), or less than about 16 percent saturated fat (soybean oil is about 15 percent saturated fat by weight). Also within the scope of non-tropical oils are oils derived from animals (e.g., lard, tallow, butter), microorganisms, and plants. The use of non-tropical base oils is preferred because tropical base oils (e.g., palm, palm kernel oil, coconut, shea butter, and allanblackia) are expensive and typically contain high amounts of saturated fatty acids. In addition, some types of tropical oils (e.g., palm oil and palm kernel oil) have been associated with destruction of the rainforest. In many embodiments, the interesterified base oil and the hardstock fat are prepared from greater than about 50% wt. non-tropical base oils; or about 75% wt. or greater non-tropical base oils; or about 90% wt. or greater non-tropical base oils; or about 99% wt. or greater non-tropical base oils. In an exemplary embodiment, the interesterified base oil and the hardstock fat are prepared from 100% wt. non-tropical base oils, such as soybean oil.

In one embodiment, the shortening particle compositions of the invention comprise a plurality of shortening particles wherein the particles comprise a shortening composition that comprises: (i) an interesterified base oil; and (ii) a hardstock fat; wherein the interesterified base oil and the hardstock fat are prepared from non-tropical base oils; wherein the shortening composition has a Solid Fat Content (SFC) profile having a slope of about −0.45 to about −1.77 (% solids/° C.); and wherein the shortening composition has a Mettler Drop Point of about 54° C. to about 62° C., or from about 58° C. to about 62° C.

In another embodiment, the shortening particle compositions of the invention comprise a plurality of shortening particles wherein the particles comprise a shortening composition that comprises: (i) an interesterified base oil; and (ii) a hardstock fat; wherein the interesterified base oil and hardstock fat are prepared from non-tropical base oils wherein the shortening composition has a Solid Fat Content (SFC) profile that fits the equation:

$$y=mx+b$$

where:
   y is the SFC in % solids;
   m is the slope of the SFC profile which ranges from about −0.45 to −1.77 (% solids/° C.);
   x is the temperature in ° C.; and
   b is the intercept of the SFC profile which ranges from about 40 to about 74 (% solids); and
   wherein the shortening composition has a Mettler Drop Point (MDP) of about 54° C. about 62° C., or a MDP of from about 58° C. to about 62° C.

In yet another embodiment, the shortening particle compositions of the invention comprise a plurality of shortening particles comprising a shortening composition that comprises (i) interesterified soybean oil; and (ii) fully-hydrogenated soybean oil; wherein the shortening composition has an SFC profile that is contained within the region bounded by an x-intercept between about 42° C. and about 84° C. and a y-intercept between about 40 (% solids/° C.) and about 74 (% solids/° C.).

In yet another embodiment, the invention provides dough products comprising flour, water, a leavening agent, and a plurality of shortening particles of the invention that are distributed throughout the dough composition. The dough products may be laminated or non-laminated, and may be developed or undeveloped.

BRIEF DESCRIPTION OF THE DRAWINGS

The present invention will be further explained with reference to the attached figures, wherein like structure is referred to by like numerals views, and wherein:

FIG. 2 is a graph displaying SFC profiles for several fat compositions including an embodiment of a shortening particle composition of the invention;

FIGS. 6A-6B are photographs showing flaking of an embodiment of the invention (FIG. 6A) as compared to the flaking of an interesterified base oil (FIG. 6B).

DETAILED DESCRIPTION

The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

Figure 1:
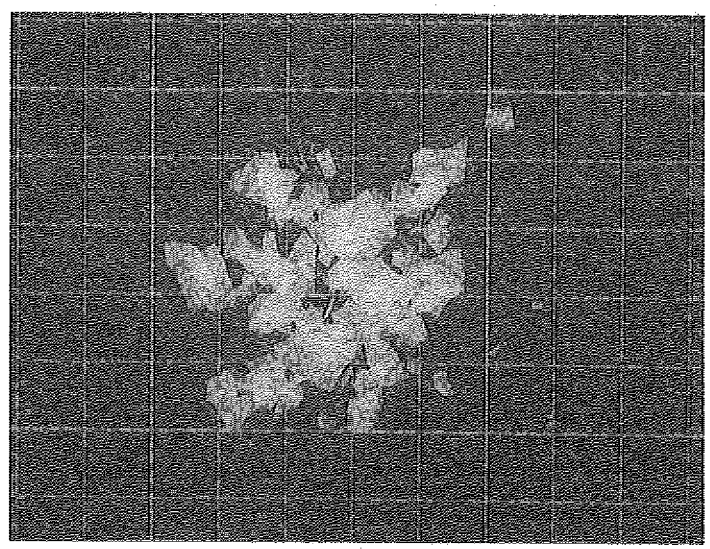
FIG. 1 is a photograph showing a representative embodiment of a shortening particle composition of the invention.

Shortening particle compositions of the invention comprise a plurality of discrete shortening particles that are individually separate and distinct from one another. The particles may have any desired shape, for example, chips, flakes, rods, spheres, and other regular and irregular shapes. At room temperature, the individual shortening particles do not adhere to one another to an appreciable degree. This allows the shortening particles to be handled, dispensed, and applied to a dough composition as individual particles, rather than as a single solid. A photograph showing representative shortening particles is shown in FIG. 1.

In many embodiments, the shortening particles have a thickness that ranges from about 0.02 inches to about 0.10 inches, more typically about 0.03 inches to about 0.07 inches, and most typically about 0.035 inches to about 0.055 inches. The color of the particles can range from white to grey with a corresponding opaque to translucent transparency scale. The particles may optionally include other ingredients or additives for use in a dough such as a flavor or a sweetener, and may be colored (e.g., yellow, red, brown). The particles can be texturally described as hard and brittle, to rather soft and pliable, but typically will fracture and break upon sufficient force (deformation). The surface of the particle may also exhibit some smear under a shear force resulting in residue on the article applying the shearing force.

In many embodiments, the composition making up the shortening particles (i.e., the shortening particle composition) comprises an interesterified base oil that is blended with a hardstock fat. In many embodiments, the interesterified base oil and hardstock fat are prepared from base oil compositions comprising one or more non-tropical base oils, for example, soybean oil.

The relative amounts of interesterified base oil and hardstock fat in a shortening composition or shortening particles can be as desired and useful with preferred relative amounts resulting in a shortening composition capable of being processed into shortening particles (e.g., flakes) as described and useful for preparing a dough. Preferred relative amounts can also be selected to result in a dough prepared from the shortening composition having a desired combination of taste, feel, texture, and cosmetic properties. The relative amounts can also depend on the compositions of both the interesterified base oil and hardstock fat. In certain preferred embodiments of shortening compositions and shortening particles, interesterified base oil can be present in an amount ranging from about 50% wt. to about 98% wt. of the composition and hardstock fat can be present in an amount ranging from about 2% wt. to about 50% wt. of the composition. In an exemplary embodiment, a shortening particle composition can comprise from about 4% wt. to about 25% wt. hydrogenated soybean oil, and from about 75% wt. to about 96% wt. interesterified soybean oil. In another exemplary embodiment, the composition comprises from 65 to 90% wt. interesterified soybean oil and from about 10 to 35% wt. hydrogenated soybean oil. In many embodiments, the shortening particle composition comprises an interesterified base oil and a hardstock fat that are prepared from base oil compositions comprising 100% wt. non-tropical base oils (e.g., soybean oil).

The various ingredients making up the shortening particle compositions are described in more detail below.

Shortening particle compositions of the invention comprise an interesterified base oil. Useful base oil compositions for preparing the interesterified base oil typically comprise fatty acid esters of glycerol, for example, monoglycerides, diglycerides, and triglycerides. In many embodiments, the interesterified base oil is prepared from one or more non-tropical base oils. Examples of non-tropical base oils include oils obtained from soybean, rapeseed (canola), sunflower, peanut, hazelnut, walnut, cottonseed, olive, corn, grapeseed, rice bran, sesame, safflower, linseed/flax, oat and wheat germ. The base oils may be natural or genetically modified or may be trait enhanced. Examples include low linolenic soybean oil, high oleic canola oil, and high oleic soybean oil. Also within the scope of non-tropical base oils are triglyceride oils that are derived from microorganisms, animals (e.g., lard, tallow, butter), and plants.

Interesterification refers to the process of rearranging the distribution of fatty acids on the triglyceride molecule, resulting in melting and crystallization characteristics that are similar to partially hydrogenated oils, but without creation of trans fatty acids. Interesterification may be conducted using techniques known to those of skill in the art and may be conducted by an enzymatic process or a chemical process. Details of interesterification can be found, for example, in "*Interesterification Products and Processes*" JOACS, September 1967; Vol. 41; 414A.

In an exemplary embodiment, the base oil comprises interesterified soybean oil. One useful interesterified base oil is the interesterified hydrogenated soybean oil available from ADM under the trade designation "ADM Product Code 106-150". ADM Product Code 106-150 is an interesterified soybean based shortening having 4% maximum trans fatty acids and having a Mettler Drop Point (MDP) of 47.5° C. to 51.5° C. (117.5° F. to 124.7° F.). ADM Product Code 106-150 has an SFC profile of 27-33 at 50° F.; 21-26 at 70° F.; 13-18 at 80° F.; 8-13 at 92° F.; and 5-9 at 104° F. Another useful interesterified base oil comprises a blend of interesterified soybean oil and hydrogenated soybean oil and is available from ADM under the trade designation "ADM Product Code 106-100." ADM Product Code 106-100 has 4% maximum trans fatty acids and has a Mettler Drop Point (MDP) of 52° C. to 56° C. (125.6° F. to 132.8° F.). ADM Product Code 106-100 has an SFC profile of 22-34 at 50° F.; 18-27 at 70° F.; 10-18 at 92° F.; and 6.5-14.5 at 104° F.

Shortening particle compositions of the invention comprise a hardstock fat that is blended with the interesterified base oil to form the shortening particle composition. By hardstock fat it is meant that the fat is a solid at room temperature or very near room temperature. Hardstock fats typically have a melting point ranging from about 50° C. to about 80° C. (122° F. to 176° F.), or from about 60° C. to about 70° C. (140° F. to 158° F.).

In many embodiments the hardstock fat comprises glycerides of fatty acids such as monoglycerides, diglycerides, and triglycerides. The glycerides have a fatty acid composition that comprises a very high percentage of saturated fatty acids. The solid fat component can be very low in trans fatty acids, since only a very few of the fatty acids have residual sites of unsaturation.

In many embodiments, the hardstock fat is prepared from one or more non-tropical base oils. Examples of non-tropical base oils include oils obtained from soybean, rapeseed (canola), sunflower, peanut, hazelnut, walnut, cottonseed, olive, corn, grapeseed, rice bran, sesame, safflower, linseed/flax, oat and wheat germ. The base oils may be natural or genetically modified or may be trait enhanced. Examples include low linolenic soybean oil, high oleic canola oil, and high oleic soybean oil. Also within the scope of non-tropical base oils are triglyceride oils that are derived from microorganisms, animals (e.g., lard, tallow, butter), and plants. Also within the scope of non-tropical oils are oils derived from animals (e.g., lard, tallow, butter), microorganisms, and plants.

In many embodiments, the hardstock fat is produced by hydrogenating the unsaturated fatty acids that are present in the non-tropical base oil in order to increase the amount of saturated fatty acids. Techniques for hydrogenation of vegetable oils are known in the art and include, for example, reacting a vegetable oil having unsaturated fatty acids with hydrogen gas in the presence of a hydrogenation catalyst, for example, a supported nickel catalyst. The hydrogenated vegetable oil may be fully hydrogenated in order to achieve an iodine value (I.V.) of about 10 or less, or about 5 or less. Representative hydrogenated solid fats include hydrogenated soybean oil, hydrogenated cottonseed oil, hydrogenated palm oil, hydrogenated palm kernel oil, hydrogenated coconut oil, and mixtures thereof. Non-hydrogenated oils may also be fractionated to achieve hardstock fat that can have an iodine value (I.V.) of 35 or less. These non-hydrogenated oils may also be suitable for compositions of the invention.

In some embodiments, the hardstock fat comprises fully-hydrogenated soybean oil that has an iodine value (I.V.) of about 5 or less. One useful hardstock fat comprising fully-hydrogenated soybean oil is commercially available from Stratas Foods, LLC under the trade designation "DRITEX S". DRITEX S is a fully-hydrogenated flaked shortening that has a Mettler Drop Point of 65° C. to 70° C. and has a maximum I.V. of 5.0.

One well-known technique for characterizing fat compositions is Solid Fat Content (SFC). SFC is determined for a fat sample by detecting the NMR signal from both liquid and solid components in the fat sample, or by detecting the change in the liquid signal as it is displaced by solid. AOCS methods for determining SFC include AOCS Cd 16b-93 revised in 2000 (Direct Method) and AOCS Cd 16-81 revised in 2000 (Indirect Method). Using SFC, a melting curve or SFC profile can be created by measuring SFC for a fat sample at several different temperatures, and then plotting SFC as a function of temperature. The slope of the SFC profile can be determined by using numerical methods to fit a line to the SFC values, and performing linear regression to establish the slope and intercept of the fitted line. Using this technique, a line having the linear form SFC (% solids)=m(° C.)+b can be obtained where m is the slope of the SFC profile in (% solids/° C.), and b is the y-intercept of the SFC profile in (% solids).

Conventionally, shortening particles used in bakery products have fairly steep slope (m) for the Solids Fat Content (SFC) profile (i.e., a high SFC at 10° C. (50° F.) and low SFC at 40° C. (104° F.)). A fairly steep slope is considered desirable because it is characteristic of a fat composition that melts quickly when placed in the mouth thereby avoiding a "waxy" mouth feel when the fat is consumed as part of a bakery product. In contrast to this, however, shortening particle compositions of the invention have a relatively flat slope (i.e., a relatively smaller negative slope) for the SFC profile. In many embodiments, the slope of the SFC profile ranges from about −0.70 to about −0.90 (% solids/° C.), more typically ranging from about −0.78 to about −0.80 (% solids/° C.). A flat SFC slope is desirable since flakes prepared with a composition having a flat SFC profile are more stable as particle since the composition does not melt as easily with small temperature variations that may occur during manufacturing, shipping, and storage conditions.

FIG. 2 displays SFC profiles for various fat particle compositions. As shown in FIG. 2, the SFC profile for the shortening particle composition of the invention has a lower (i.e., flatter) slope than the other fat particle compositions shown. In the embodiment shown in FIG. 2, the SFC profile of the shortening particle composition of the invention can be fitted to the linear equation:

$$y = mx + b$$

where
y is SFC in % solids;
m ranges from about −0.45 to −1.77 (% solids/° C.);
x is the temperature in ° C.; and
b ranges from about 40 to about 74 (% solids).

More typically, m ranges from about −0.70 to about −0.90 (% solids/° C.) or from about −0.75 to about −0.90 (% solids/° C.). More typically, b ranges from about 40 to about 65 (% solids) or from about 45 to about 64 (% solids).

Also useful in characterizing shortening particle compositions of the invention are the x-intercept and y-intercept of the SFC profile. The y-intercept represents the SFC for the composition at a temperature of 0° C. In many embodiments, the y-intercept of the SFC profile ranges from about 40% to about 74% solids, or from about 54% to 74% solids. The x-intercept of the SFC profile represents the temperature at which the SFC is 0%. Due to the flat SFC profile, the x-intercept for shortening compositions of the invention takes place at a higher temperature than is typically observed for conventional shortening particle compositions. In many embodiments, the x-intercept of the SFC profile ranges from about 42° C. to about 84° C., or from about 43° C. to about 74° C. In some embodiments, the x-intercept of the SFC profile ranges from about 60° C. to about 84° C. or from about 62° C. to about 74° C.

Figure 3A:
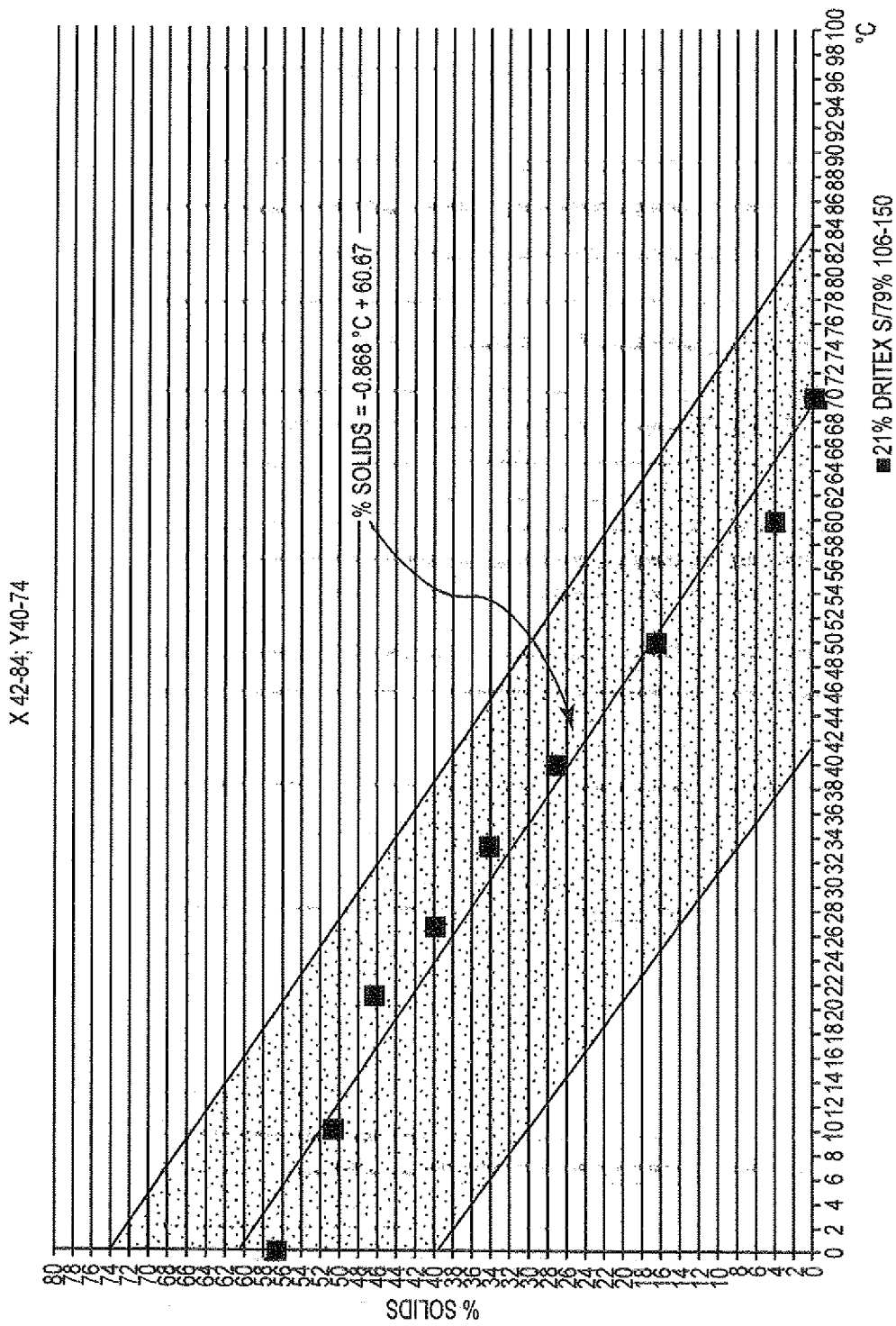
FIGS. 3A-3D are graphs displaying SFC profile regions for various shortening particle compositions of the invention.
Figure 3B:
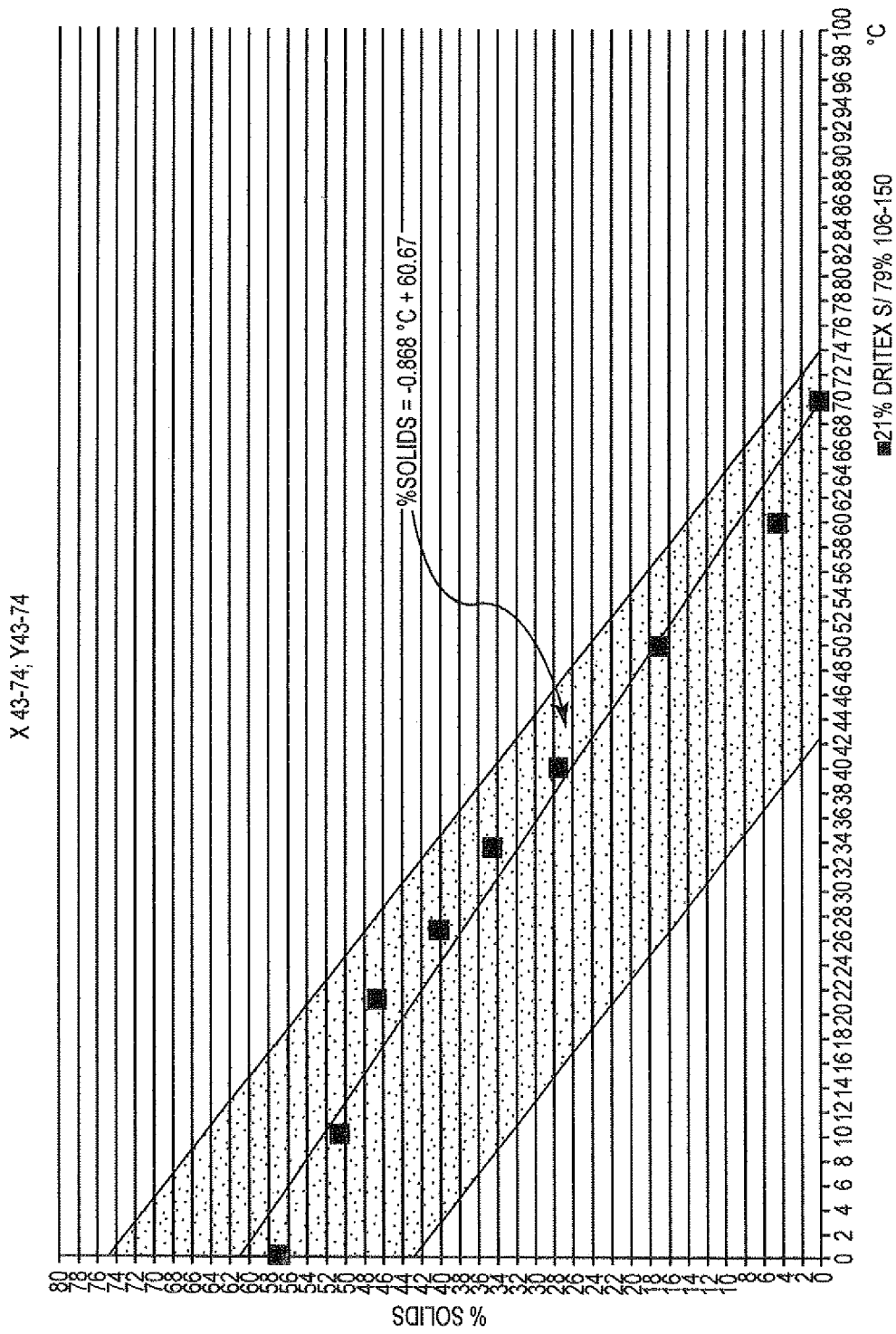
Figure 3C:
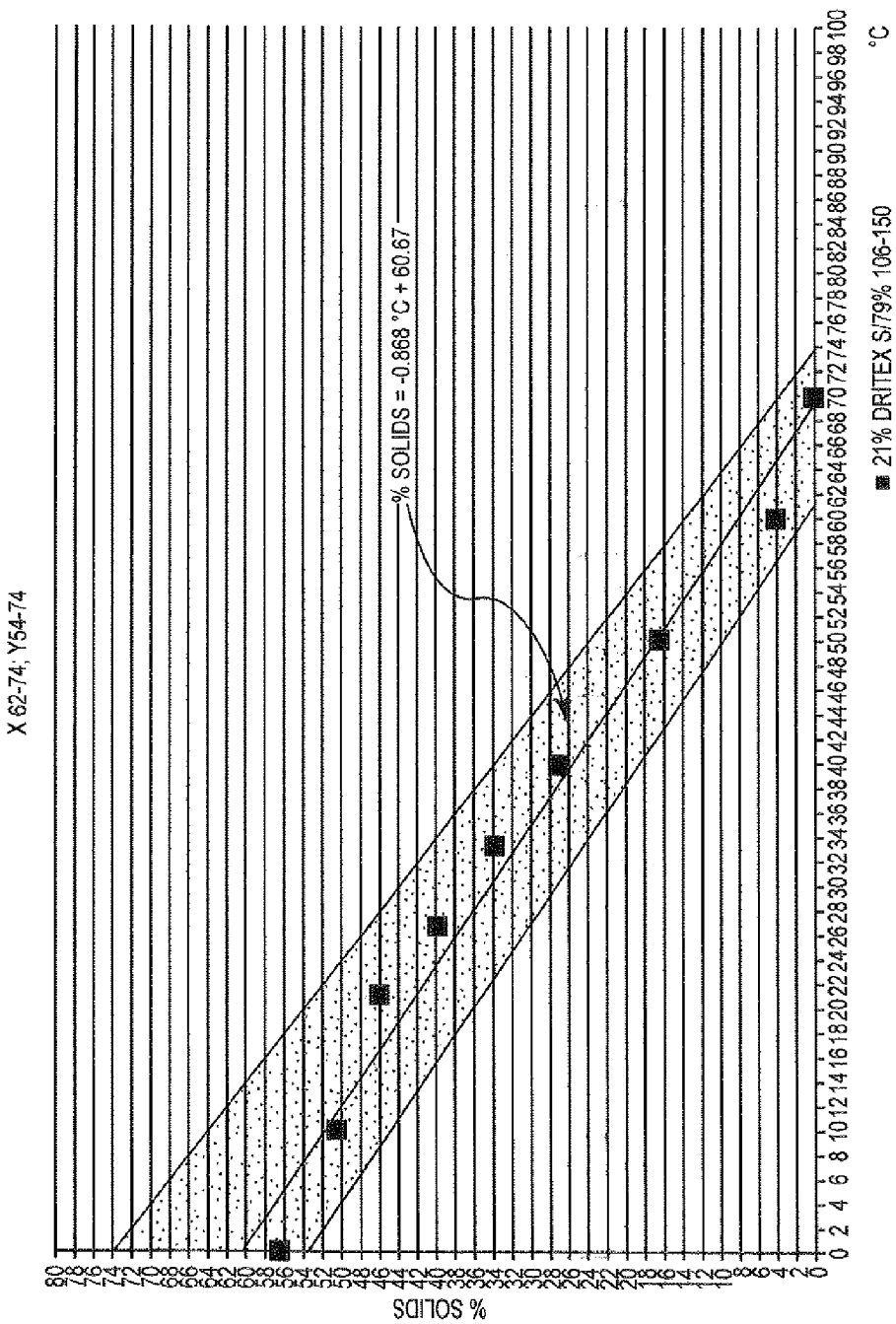
Figure 3D:
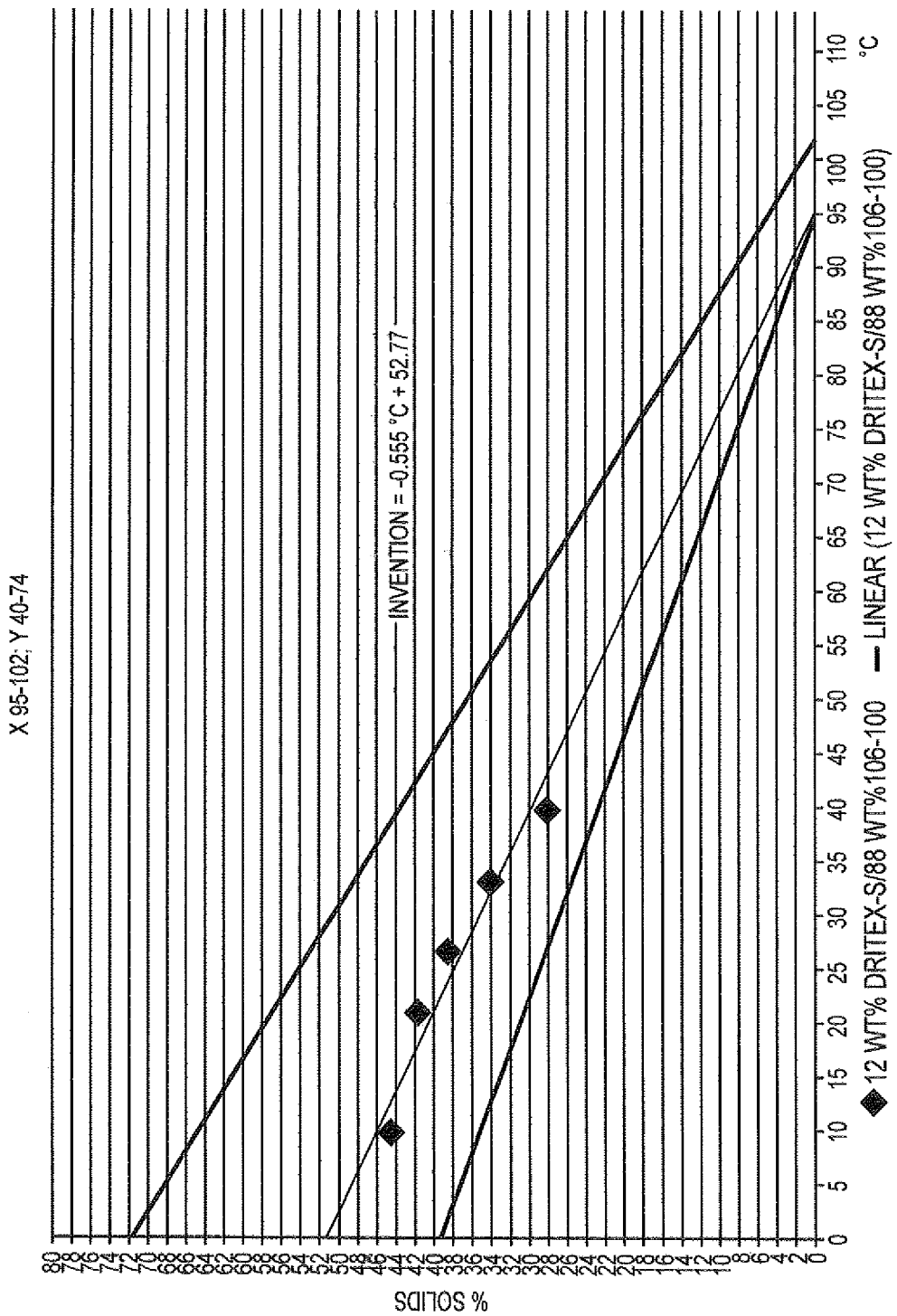

In some embodiments, the SFC profile of the shortening composition is contained within the area bound on the x-axis by about 42° C. to about 84° C. and bound on the y-axis by about 40 to about 74 (% solids/° C.). This area can be represented graphically as shown by the shaded area in FIG. 3A. In another embodiment, the area is bound on the x-axis by about 43° C. to about 74° C. and bound on the y-axis by about 43 to about 74 (% solids/° C.). In yet another embodiment, the area is bound on the x-axis by about 62° C. to about 74° C. and bound on the y-axis by about 54 to about 74 (% solids/° C.). In yet another embodiment, the area is bound on the x-axis by about 95° C. to about 102° C. and is bound on the y-axis by about 40 to about 74 (% solids/° C.). These embodiments are represented graphically in FIGS. 3B, 3C, and 3D, respectively. In FIGS. 3A-3C the SFC profile for an embodiment of the invention comprising 21% wt. Dritex S and 79% wt. 106-150 is shown in each figure. In FIG. 3D, the SFC profile for an embodiment of the invention comprising 12% wt. Dritex S and 88% wt. 106-100 is shown in the figures.

Shortening particle compositions of the invention exhibit a Mettler Drop Point (MDP) that is higher than the Mettler Drop Point for shortening flakes that are typically used in baked dough products. Specifically, many conventional shortening particle compositions have a Mettler Drop Point below about 50° C. (122° F.). In many embodiments, the shortening particles of the invention comprise a shortening composition that has a Mettler Drop Point (MDP) that ranges from about 54° C. to about 62° C. (130° F. to 143° F.), or from about 58° C. to about 62° C. (136° F. to 144° F.), or from about 58° C. to about 60° C. (136° F. to 140° F.). Despite the higher melting point, the shortening flakes of the invention can be incorporated into baked dough products that have acceptable sensory attributes and physical property attributes. A higher melting point is also advantageous since it makes the shortening particles more tolerant of exposure to high temperatures without appreciably adhering to one another. This allows the shortening particles to be more easily transported, stored, and used in manufacturing processes.

In many embodiments, the shortening particle composition of the invention is low in saturated fatty acids, trans fatty acids, or total combined saturated fatty acids and trans fatty acids. Trans-fatty acids refer to fatty acids that include a carbon-carbon double bond that is present in the trans configuration. Saturated fatty acids refers to fatty acids that do not contain any sites of unsaturation, for example, carbon-carbon double bonds.

In a representative embodiment, the shortening composition comprises about 3% wt, or less trans fatty acids. In another representative embodiment, the shortening composition comprises about 58% wt. or less saturated fatty acids. In yet another representative embodiment, the shortening composition comprises about 61% wt. or less total for both trans fatty acids and saturated fatty acids.

In many embodiments, the shortening particle compositions of the invention display a rapid crystallization rate as compared to other known shortening particle compositions. A rapid crystallization rate is advantageous in that it allows the shortening particle composition to be rapidly cooled and crystallized during the process of preparing shortening particles. The crystallization rates can be measured by shock-cooling the molten oil blend and then measuring the percent solids with time progression using Nuclear Magnetic Resonance (NMR) techniques.

Figure 4:
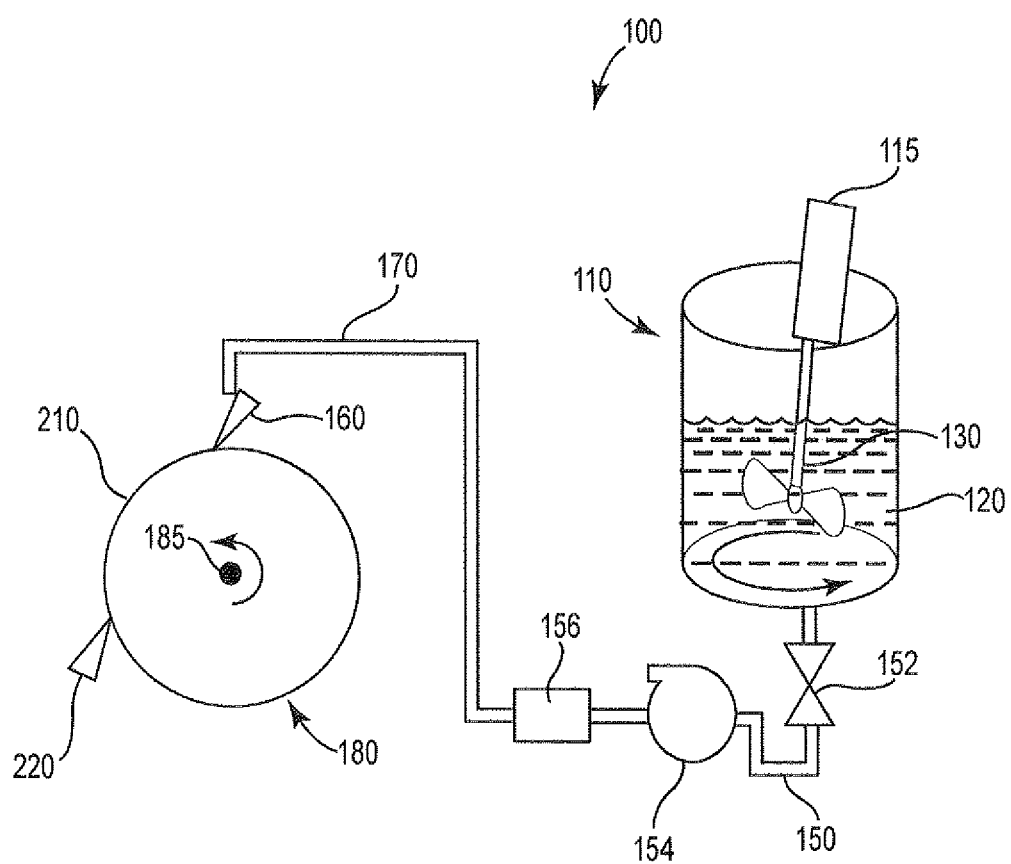
FIG. 4 is a representative apparatus suitable for making shortening particles of the invention.

Shortening particles of the invention may be prepared using a flaking apparatus as shown in FIG. 4. Referring to FIG. 4, flaking apparatus 100 includes fat reservoir 110 that holds the shortening composition 120 that is to be flaked. Mounted in reservoir 110 is high shear mixer 115 that is equipped with a high shear-mixing blade 130. Examples of suitable high shear mixers include Breddo, IKA Rototron, Ross brand high shear mixers, and LIGHTNIN brand variable speed high shear mixers. Fat reservoir 110 is connected to jacketed piping 150, which includes valve 152, pump 154, and flow meter 156. Temperature controlled chute 160 is mounted in close proximity to flaking roll 180 for application of the shortening composition 120 to the outer surface 210 of the flaking roll 180. Flaking roll 180 is rotatably mounted so that during operation of apparatus 100, the flaking roll 180 rotates about its axis 185. A scraping blade 220 is positioned in contact with the outer surface 210 of the flaking roll 180 in order to scrape the solidified shortening composition 120 from the surface of the flaking roll 180.

Figure 4A:
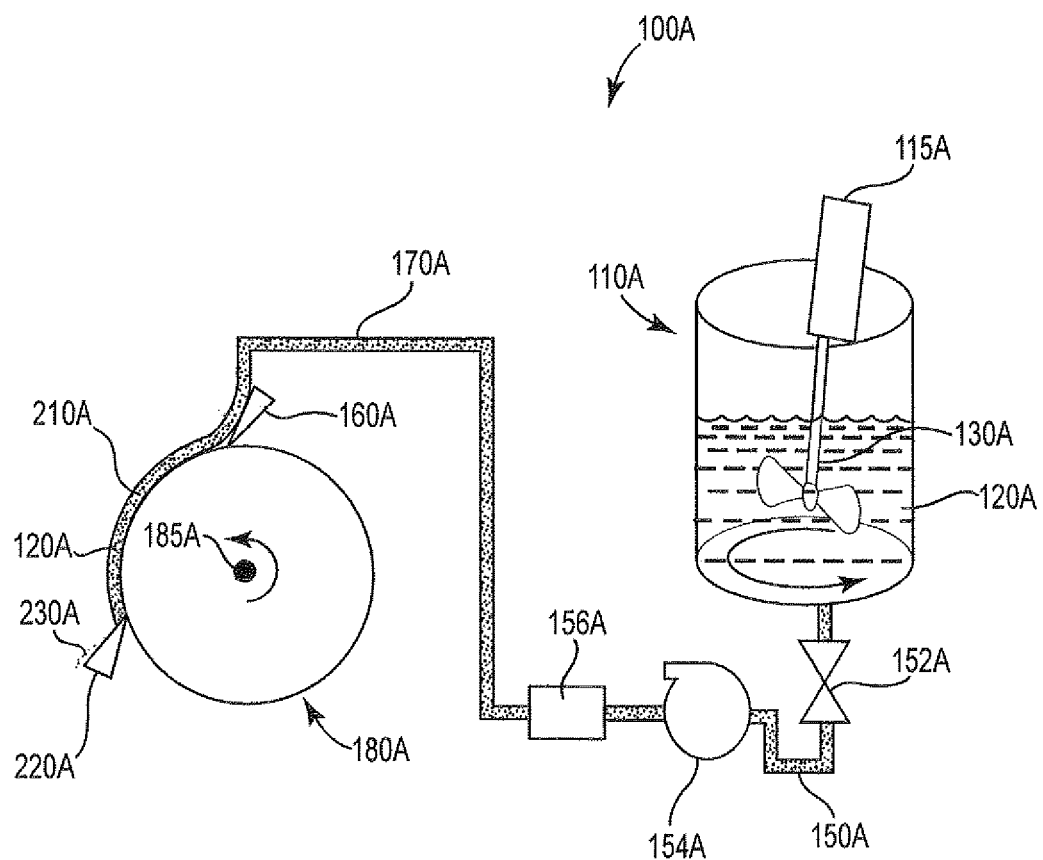
FIG. 4A is the apparatus of FIG. 4 shown being used to make shortening particles of the invention.

FIG. 4A shows a schematic representation of apparatus 100A being used to produce shortening flakes of the invention. In operation of apparatus 100A, a shortening composition of the invention 120A is first prepared in reservoir 110A. The high shear mixer 115A is used to mix the various ingredients making up the shortening composition 120A. After preparing the shortening composition 120A, the composition is then pumped through jacketed piping 150A to temperature controlled chute 160A. The shortening particle composition 120A is typically maintained at a temperature ranging from about 60° C. to about 70° C. At temperature controlled chute 160A, the shortening composition 120A is applied to the outer surface 210A of flaking roll 180A in the form of a thin coating. The coating is typically applied at a thickness of about 0.5 mm to about 2.0 mm. During application of the shortening composition 120A, the flaking roll 180A is rotated about its axis 185A. Cooling is supplied to the flaking roll 180A to cool the shortening composition 120A as it is in contact with the outer surface 210A of the flaking roll 180A. As the flaking roll 180A rotates about its axis 185A, the shortening composition 120A cools to a temperature below its melting point and solidifies on the outer surface 210A of the flaking roll 180A. After it is solidified, the shortening composition 120A is scraped from the outer surface 210A of flaking roll 180A by scraping blade 220A that is positioned in contact with the outer surface 210A of the flaking roll 180A. The scraping blade 220A causes the solidified shortening composition 120A to be dislodged from the outer surface of the flaking roll 210A in the form of thin sheets or flakes 230A. The flakes 230A are then collected.

The desired particle dimensions may be controlled, for example, by factors such as the depth of the shortening composition 120A in the trough (not shown), the fat composition temperature at the point of deposit, the surface temperature of the rotating drum, and the rotation speed of the drum. For example, in many embodiments, the shortening particle composition is deposited at temperature ranging from about 50° C. to about 65° C., more typically ranging from about 56° C. to about 60° C. In many embodiments, the depth of the fat composition in the trough ranges from about 2 inches to about 4 inches. In many embodiments the surface temperature of the drum ranges from about 0° C. to about −10.0° C., more typically ranging from about −3.0° C. to about −5.0° C.

The shortening particle compositions of the invention may be used to prepare various dough compositions and dough articles. The dough compositions typically comprise flour, water, one or more leavening agents, and may also include other optional ingredients as described herein. The dough composition may be a developed dough composition or an undeveloped dough composition. Representative dough compositions include biscuits, pizza crusts, pot pie crusts, cinnamon rolls, and various bread doughs.

The dough compositions may include one or more types of flour. The dough compositions typically comprise about 15% wt. or greater flour based on the total weight of the dough composition. Wheat flour may be obtained commercially from such sources as ADM Milling; Bay State Milling Co.; Conagra Inc.; General Mills, Inc.; Horizon Milling, LLC; and Rohstein Corp.

Dough compositions of the invention typically include liquid components, for example, water, milk, eggs, and oil, or any combination of these. Water is present in dough compositions to provide the dough composition with the desired rheology. Water may be added during processing in the form of ice, to control the dough temperature during processing; the amount of any such water used is included in the amount of liquid components. The precise amount of water depends on factors known to those skilled in the dough making art including, for example, whether the dough composition is a developed or under-developed composition.

Water may be present in dough compositions of the invention in an amount of about 15% wt. or greater. In developed compositions, the amount of water from all sources, for example, water, eggs, milk, etc. should not be so high that the dough composition becomes soft and cannot maintain its desired closed-cell structure including bubbles of carbon dioxide and water vapor. Also, the amount of water should not be so low that the dough composition is dry and has no ability to expand.

The dough compositions can be caused to expand (i.e., leaven) by any leavening mechanism, such as by one or more of the effects of: entrapped gas, such as entrapped carbon dioxide, entrapped oxygen, or both; by action of chemical leavening agents; or by action of a biological agent, such as a yeast. Thus, a leavening agent may be an entrapped gas, such as layers or cells (bubbles) that contain carbon dioxide, water vapor, or oxygen, etc.; any type of yeast (e.g., cake yeast, cream yeast, dry yeast, etc.); or a chemical leavening system (e.g., containing a basic chemical leavening agent and an acidic chemical leavening agent that react to form a leavening gas, such as carbon dioxide).

In some embodiments, the dough compositions are yeast-leavened. As used herein the term "yeast-leavened" refers to dough compositions that are leavened primarily due to the production of gaseous metabolites of yeast; chemical leavening agents may optionally be present, but in minor amounts, preferably less than about 10% wt. chemical leavening agent based on the total weight of the leavening agent (yeast and chemical leavening agent) or may not be present at all. The yeast may be any suitable yeast known to those of skill in the art, for example, fresh cream/liquid yeast, fresh compressed yeast, active dry yeast, and instant yeast. In some embodiments, the yeast is fresh compressed yeast (e.g., in cake or crumbled form) comprising about 65% to about 75% water and about 25% to about 35% yeast. The amount of yeast can be an amount that will produce a desired volume of gaseous metabolites, as known to one of skill in the art. The amount of yeast present in the dough composition can be up to about 10% wt. (e.g., about 2% wt. to about 8% wt. for developed dough compositions, and less than about 1% wt. to about 5% wt. for under-developed compositions).

In some embodiments a chemical leavening agent may be used in addition to yeast. Acidic chemical leavening agents (or acid agents) that may be useful include those generally known in the dough and bread-making arts. Acidic agents may be relatively soluble within different temperature ranges and may or may not be encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dehydrate (DCPD), glucono-delta-lactone (GDL), an others. Commercially available acidic chemical leavening agents include those sold under the trade designations "LEVN-LITE" (SALP); "PAN-O-LITE" (SALP+MCP); "STABIL-9" (SALP+AMPC); "PY-RAN" (AMCP); and "HT MCP" (MCP).

The dough composition may also include encapsulated basic chemical-leavening agents. Useful basic chemical leavening agents are known in the dough and bread-making arts, and include soda (i.e., sodium bicarbonate, $NaHCO_3$), potassium bicarbonate ($KHCO_3$), ammonium bicarbonate ($NH_4HCO_3$), etc. Encapsulating the basic chemical leavening agent provides separation between the basic agent and the bulk of the dough composition. If present, chemical leavening agents can comprise less than about 1% wt of the dough composition (e.g., less than about 0.5% wt. or less than about 0.3% wt.).

To provide a fat component, examples of dough compositions can include the shortening composition (e.g., shortening particles) as fat, with no additional fat. Alternately, other exemplary dough compositions may include the shortening composition and may optionally include one or more additional fat component ("dough fat") added to the dough composition at the time the dough is prepared and substantially interspersed and distributed throughout the dough composition. The amount of fat in a dough composition from the described shortening composition (e.g., shortening particles) can be based on the type of dough composition being prepared, but will generally be from about 1% wt to 30% wt, e.g., from 7% wt to 20% wt, or from 10% wt to 15% wt. More specifically, a dough may include up to about 30 percent by weight of shortening particles if the dough is to be a high fat content dough (e.g., a high fat content pot pie crust); a chemically-leavened (soda) biscuit dough may include from 7 wt % (for a low-fat biscuit) to 15 wt % shortening particles.

In addition to the shortening composition, a dough may also contain an additional (optional) fat component ("dough fat"). The type and amount of this additional "dough fat" are not particularly limited. Amounts in the range from 1 to 5 wt % may be typical for use in combination with above-identified amounts of shortening particles, but higher amounts may also be useful. The optional "dough fat" component may be derived from any source, such as vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils, such as vegetable or nut oils. Examples of shortenings include animal fats, such as lards, butter and hydrogenated vegetable oils, such as margarine. Mixtures of different fats may also be used. The type and amount of additional, optional fat will depend on the type of dough product being produced, with certain doughs including vegetable based fat (e.g., soybean oil), either hydrogenated or partially hydrogenated oil, if at all.

The dough composition may optionally include one or more sweeteners, natural or artificial, liquid or dry. If a liquid sweetener is used, the amount of other liquid components may be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include up to about 8% wt sweetener.

The dough composition may optionally include additional flavorings, for example, salt, such as sodium chloride and/or potassium chloride; whey; malt; yeast extract; inactivated yeast; spices; vanilla; natural and artificial flavors; etc.; as is known in the dough product arts. The additional flavoring can be included in an amount in the range from about 0.1% wt to about 10% wt of the dough composition (e.g., from about 0.2% wt to about 5% wt of the dough composition.

The dough composition may optionally include particulates, such as raisins, currants, fruit pieces, nuts, seeds, vegetable pieces, and the like, in suitable amounts.

The dough composition may optionally include other additives, colorings, and processing aids, for example, gliadin (e.g., less than about 1% to improve extensibility (such as measured by a Brabender Extensograph) in under-developed dough), emulsifiers include lecithin, diglycerides, polyglycerol esters, and the like, (e.g., diacetylated tartaric esters of monoglyceride (DATEM) and sodium stearoyl lactylate (SSL)).

In certain embodiments, the shortening particle compositions are used to prepare laminated dough compositions. Generally, a laminated dough can be prepared by the steps of: (a) providing a layer of a dough composition comprising flour and water; (b) applying a plurality of shortening particles of the invention to a surface of the dough layer; (c) repeatedly folding and compressing (i.e., sheeting) the dough layer to form a laminated dough comprising a plurality of layers of dough separated by layers of shortening.

Shortening flakes of the invention may also be used in non-laminated dough compositions, for example, biscuits. In those applications, shortening particles are mixed into the dough composition prior to further packaging or processing, such as sheeting, forming, extruding or cutting.

The invention will now be described with reference to the following non-limiting examples.

EXAMPLES

Examples 1-7 and Comparative ("Comp.") Examples A-H

The compositions listed in TABLE A will be referred to throughout the Examples.

TABLE A

| Sample ID | Interesterified Base Oil | Hardstock Fat |
|---|---|---|
| Example 1 | 96% wt. ADM 106-150 | 4% wt. Dritex S |
| Example 2 | 92% wt. ADM 106-150 | 8% wt. Dritex S |
| Example 3 | 88% wt. ADM 106-150 | 12% wt. Dritex S |
| Example 4 | 79% wt. ADM 106-150 | 21% wt. Dritex S |
| Example 5 | 75% wt. ADM 106-150 | 25% wt. Dritex S |
| Example 6 | 88% wt. ADM 106-100 | 12% wt. Dritex S |
| Example 7 | 83% wt. ADM 106-100 | 17% wt. Dritex S |
| Comp. A | 98% wt. ADM 106-150 | 2% wt. Dritex S |
| Comp. B | 50% wt. ADM 106-150 | 50% wt. Dritex S |
| Comp. C | 100% ADM 106-150 | 0% wt. |
| Comp. D | 0% wt. | 100% Dritex S |
| Comp. E (218804) | Partially hydrogenated soybean oil | 0% wt. |
| Comp. F | 92% wt. ADM 106-100 | 8% wt. Dritex S |
| Comp. G | 55% wt. ADM 106-100 | 45% wt. Dritex S |
| Comp. H | 100% wt. ADM 106-100 | 0% wt. |

Figure 5:
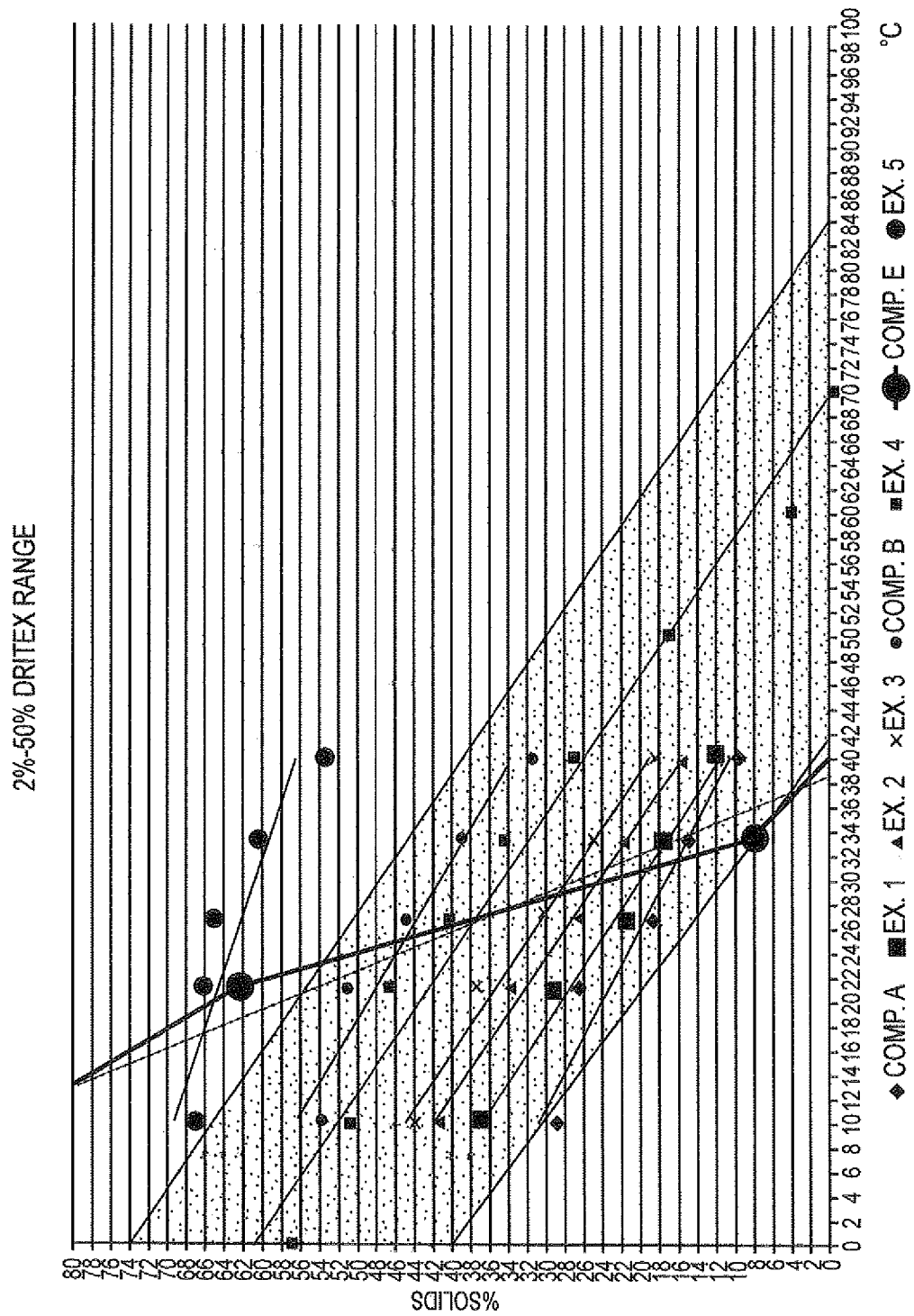
FIG. 5 is a graph displaying SFC profiles for several embodiments of the invention and several comparative examples.

The shortening compositions of TABLE A were tested for SFC using AOCS Official Test Method Cd 16b-93 entitled "Solid Fat Content (SFC) by Low-Resolution Nuclear Magnetic Resonance—The Direct Method". The SFC results (slope and intercept) of the SFC profile are provided in TABLE B and in FIG. 5.

The shortening compositions of TABLE A were tested for Mettler Drop Point (MDP) using AOCS Official method Cc 18-80 entitled "Dropping Point". The MDP results are provided in TABLE B.

The shortening compositions of TABLE A were evaluated for the ability to be flaked using a conventional chilled roll flaking apparatus as described below.

1. The compositions of TABLE A were melted together in a hand-agitated, steam-heated process kettle to a temperature of 60.0° C. The formulas are shown in TABLE A.

2. The molten blends were deposited onto a cold flaking roll. The molten blends were each deposited onto the flaking roll at a temperature of about 60.0° C., where the surface temperature of the flaking roll was about −3.3° C. As the drum rotated the molten blend cooled and fractured into solid particles, which either fall off under gravity, or were scraped off at the rear of the roll.

3. The flaking roll speed was controlled through a VFD, which was adjusted to the desired speed to achieve flakes of the desired thickness. The roll was chilled using a 50%150% mix of water and glycol with the incoming temperature of the coolant at −11.8° C., and an exit temperature of −10.8° C.

4. The residence time of the molten material on the flaking roll was ~47 seconds, and the roll was turning at a rate of ~2.44 M/min. Flakes being generated from this residence time had variable thicknesses ranging from 1 mm-1.5 mm.

The results of the flaking evaluations are provided in TABLE B. FIGS. 6A and 6B exemplify the flaking of an embodiment of the invention (FIG. 6A) as compared to the flaking of an interesterified base oil (FIG. 6B).

A TA-XT spreadability rig from Stable Microsystems was used to characterize sample compositions of the invention and comparative examples. For each sample tested the sample composition was placed into the female cone and was pressed down to eliminate air pockets. Excess sample was then scraped of with a knife to provide a flat test area. An empty sample holder was used to calibrate and align the instrument in accordance with the manufacturer's instructions. A return distance of 25.0 mm and a probe speed of 3 mm/second was used for the test.

The base oil was taken directly from the shipping box and was pressed into the female cone. The re-crystallized RT samples were taken from the manufacturers box and were melted in a microwave for 1 minute. The samples were then allowed to stand at room temperature (about 21° C.) until they re-crystallized. The re-crystallized flash cooled samples were then melted in a microwave oven for 1 minute, and were then placed in a blast freezer at −23.3° C. until re-crystallized. The samples were then re-tempered to room temperature before being run on the texture analyzer.

The results of the test are shown below. The values presented are the average of three individual values in units of kilograms (kg). A higher value indicates a harder or firmer composition that is more capable of forming discrete flakes. As shown in the data, base oil compositions had a texture value significantly less than the value of Examples 4 or 7. The composition may not be useful for forming shortening flake compositions as the material may be too soft to remain as discrete flakes.

|  | Example 7 (kg) | Comp. H (kg) | Example 4 (kg) | Comp. C (kg) |
|---|---|---|---|---|
| Base Oil | NA | 2.1 | NA | 2.1 |
| Recrystallized (Room Temp) | 45.1 | 1.7 | 22.3 | 1.1 |
| Recrystallized (Flash Cooled) | 32.2 | 5.9 | 32.2 | 6.1 |

The shortening compositions of TABLE A were evaluated for acceptability for use in a biscuit.
Biscuits were prepared as described below.
1. Biscuits were prepared using the formulation provided below.

| Ingredient | % wt. |
|---|---|
| Hard Wheat Flour | 36.0 |
| Soft Wheat Flour | 9.0 |

-continued

| Ingredient | % wt. |
|---|---|
| Water | 32.0 |
| Shortening Flakes | 12.0 |
| Leavening Ingredients | 4.0 |
| Other Dry Ingredients | 6.0 |
| Other Liquid Components | 1.0 |
| Total | 100.0 |

2. The dry ingredients were added to a Hobart 200 brand mixer fitted with a dough paddle, and were blended at low speed at room temperature (70° F.) for 45 seconds to a uniform mixture.

3. Water at 50° F. was added to the dry, blended ingredients under low speed agitation, and then the speed was increased to medium and the ingredients were mixed at room temperature for an additional 3 minutes.

4. The resulting dough was removed from the mixer and was placed on a table-top reversible sheeter. The dough was passed through sheeting rolls to obtain a final thickness of approximately 20 mm. When this thickness was achieved, the dough was removed from the sheeter and was placed on a table for cutting.

5. A hand cutter was used to produce round biscuit pieces from the dough sheet. Individual raw dough pieces were placed on an aluminum baking sheet, and then the entire baking sheet was placed in a plastic bag. The bag of raw dough pieces was then placed in a freezer at −10° F. for a minimum of 3 days.

6. The frozen biscuits were removed from the freezer and bag and were placed on a room temperature baking tray. The biscuits were baked in a reel oven at 375° F. for 12 minutes.

7. The finished biscuits were removed from the oven and were tempered for 10 minutes, prior to evaluation for flavor and texture.

8. The baked biscuits were team judged by 8 individuals for flavor and texture as compared to a control biscuit that contained a partially hydrogenated, 100% soybean shortening flake. If the both flavor and texture of the test biscuit was determined by the team to be not substantially different from the control biscuit, then the test biscuit was judged to be an adequate biscuit flake. The results of the biscuit evaluation are shown in TABLE B. Typically, the mode of failure was an unacceptable waxy mouth-feel that was a function of the fully hydrogenated portion of the composition. The occurrence of waxy mouth-feel started at about the 50% level for 106-150 and 106-100 based compositions (TABLE B).

TABLE B

| Sample ID | Slope (% solids/° C.) | Y-Intercept (% solids) | MDP (° F. ± 2° F.) [° C. ± 1.1° C.] | Capable of Making a Flake? | Adequate Biscuit Flake? |
|---|---|---|---|---|---|
| Example 1 | −0.835 | 45.0 | 131 [55] | Yes | Yes |
| Example 2 | −0.865 | 50.3 | 135 [57] | Yes | Yes |
| Example 3 | −0.857 | 53.3 | 138 [59] | Yes | Yes |
| Example 4 | −0.868 | 60.7 | 141 [61] | Yes | Yes |
| Example 5 | −0.755 | 63.8 | 140 [61] | Yes | Yes |
| Example 6 | −0.555 | 52.77 | 140 [60] | Yes | Yes |
| Example 7 | −0.544 | 55.3 | 143 [62] | Yes | Yes |

TABLE B-continued

| Sample ID | Slope (% solids/° C.) | Y-Intercept (% solids) | MDP (° F. ± 2° F.) [° C. ± 1.1° C.] | Capable of Making a Flake? | Adequate Biscuit Flake? |
|---|---|---|---|---|---|
| Comp. A | −0.668 | 37.2 | 127 [53] | No | No |
| Comp. B | −0.4237 | 73.4 | 151 [66] | Yes | No |
| Comp. C | −0.78 to −0.80 | 38.5 | 121 [50] | No | No |
| Comp. D | 0.0 to −0.1 | 95 | 154 [68] | Yes | No |
| Comp. E 218804 | −3.10 | 120.1 | 104 [40] | Yes | Yes |
| Comp. F | −0.542 | 40.6 | — | No | No |
| Comp. G | −0.454 | 72.8 | 151 [66] | Yes | No |
| Comp. H | −0.533 to −0.664 | 28 to 41 | 129 [54] | No | No |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims. All patents, patent documents, and publications cited herein are hereby incorporated by reference as if individually incorporated.

What is claimed is:

1. A shortening particle composition comprising:
a plurality of shortening particles wherein the particles comprise a shortening composition that comprises: (i) an interesterified soy oil; and (ii) hydrogenated soy oil;
wherein the shortening composition has a Solid Fat Content (SFC) profile having a slope of about −0.45 to about −1.77 (% solids/° C.) based on linear regression of SFC values at 10° C., 21.1° C., 26.7° C., 33.3° C., and 40° C.; and
wherein the shortening composition has a Mettler Drop Point of about 58° C. to about 62° C.

2. The shortening particle composition of claim 1, wherein the shortening composition has an SFC profile having a slope of about −0.7 to about −0.9 (% solids/° C.).

3. The shortening particle composition of claim 1, wherein the shortening composition comprises less than about 3% wt. total trans fatty acids.

4. The shortening particle composition of claim 1, wherein the shortening composition comprises less than about 58% wt. saturated fatty acids.

5. The shortening particle composition of claim 1, wherein the shortening composition comprises less than about 61% wt. total of saturated fatty acids and trans fatty acids.

6. The shortening particle composition of claim 1, wherein the interesterified base oil is prepared from a base oil composition consisting of soybean oil.

7. The shortening particle composition of claim 1, wherein the interesterified base oil is interesterified soybean oil and hydrogenated soybean oil.

8. The shortening particle composition of claim 1, wherein the hydrogenated soy oil has an iodine value (I.V.) of about 5 or less.

9. The shortening particle composition of claim 1, wherein the interesterified soy oil is present in an amount ranging from about 50% wt. to about 98% wt. of the shortening composition.

10. The shortening particle composition of claim 1, wherein the shortening composition comprises about 4% wt. to about 25% wt. hydrogenated soybean oil and about 75% wt. to about 96% wt. interesterified base soy oil.

11. A dry mix for a batter or dough comprising the shortening particle composition of claim 1.

12. A shortening particle composition comprising:
a plurality of shortening particles wherein the particles comprise a shortening composition that comprises: (i) an interesterified soy oil; and (ii) hydrogenated soy oil;
wherein the interesterified base oil and the hardstock fat are prepared from a base oil composition comprising one or more non-tropical base oils;
wherein the shortening composition has a Solid Fat Content (SFC) profile, based on linear regression of SFC values at 10° C., 21.1° C., 26.7° C., 33.3° C., and 40° C., that fits the equation:

$$y = mx + b$$

where:
y is SFC in % solids;
m ranges from about −0.45 to −1.77 (% solids/° C.);
x is the temperature in ° C.; and
b ranges from about 45 to about 74 (% solids); and
wherein the shortening composition has a Mettler Drop Point of about 54° C. to about 62° C.

13. The shortening particle composition of claim 12, wherein the shortening particle composition has an SFC profile having an x-intercept ranging from about 42° C. to about 84° C.

14. The shortening particle composition of claim 12, wherein the shortening particle composition has an SFC profile having an x-intercept ranging from about 95° C. to about 102° C.

15. The shortening particle composition of claim 12, wherein the shortening particle composition has an SFC profile having a y-intercept ranging from about 40% to about 74% solids.

16. A dough product comprising:
a dough composition comprising flour, water, and a leavening agent; and
a plurality of shortening particles of claim 1 distributed throughout the dough composition.

17. A dough product comprising:
a dough composition comprising flour, water, and a leavening agent; and
a plurality of shortening particles of claim 12 distributed throughout the dough composition.

* * * * *